UNITED STATES PATENT OFFICE 2,628,904

EGG SUBSTITUTE ADMIXTURE AND PROCESS OF PRODUCING THE SAME

Montie M. Healy, Flint, Mich.

No Drawing. Application August 10, 1951, Serial No. 241,385

7 Claims. (Cl. 99—114)

The present invention relates to nutritive food compounds and more particularly to an egg substitute admixture for use in improving domestic and commercial confectionery products such as cakes, baked products and other edible foods in which eggs are commonly used.

One object is to provide an egg substitute composition in dry powdered form which can be conveniently mixed with various prepared flours in lieu of the eggs required which will materially improve the texture of the cake or other confectionery product, and will otherwise improve products produced from domestic and commercial ready-mixed cake flours when a small quantity of the composition is admixed with such cake flours.

Another object is to provide an egg substitute composition employing tapioca flour which when hydrated has a propensity to form a colloidal jel portion, and another portion which absorbs water forming semi-solid masses. In addition, tapioca starches entrain gases when hydrated which insures maintenance of cake volume and controlled fineness of texture.

Another object is to produce an egg substitute, employing tapioca and rice starches, whereby to provide an inexpensive composition and an effective substitute for eggs.

A further object is to provide an egg substitute which can be kept or stored for a long period of time without deterioration, and which is not effected adversely by temperature changes.

In preparing my composition, I use the following ingredients, the parts being by weight:

| Ingredient | | Amount |
|---|---|---|
| Processed rice flour | lbs | 100 |
| Tapioca flour (best grade) | lbs | 25 |
| Powdered skim milk | lbs | 25 |
| Powdered hen egg albumen | lbs | 10 |
| Cream of Tartar | lbs | 3 |
| Bicarbonate of soda | lb | 1 |
| Coloring (powdered yellow egg) | oz | 8 |

The above-named ingredients are compounded as follows:

I first take a miter bowl and pestle; add small amount at a time of cream of tartar and coloring and mill out thoroughly, using 1 lb. of cream of tartar to the 8 oz. of coloring. When coloring is thoroughly milled out with cream of tartar, mix it thoroughly with the 10 lbs. hen egg albumen and then sift over the other ingredients. Next, mix the remaining two lbs. of cream of tartar into the lot of ingredients, and then add and mix the 1 lb. of soda bicarbonate, sifting the mixed ingredients five or six times.

The processed rice flour and tapioca flour together with the powdered skim milk are intimately mixed by agitation, and then the hen egg albumen, cream of tartar and coloring mixed as above are sifted into the rice flour, tapioca flour and skim milk. After the ingredients have been mixed as above, the remaining 2 lbs. of cream of tartar are added and the 1 lb. of sodium bicarbonate is introduced. The entire composition is then repeatedly sifted five or six times to thoroughly intermix the various particles. Thus, a dry-type powdered egg substitute is formed which it is believed can be packaged and sold successfully on the market because of its effectiveness and low cost and good keeping qualities when compared to real eggs.

An essential ingredient of the preparation is the use or introduction of tapioca flour in a dry-type egg substitute. Tapioca flour is formed by milling the tapioca pellets or granules, and possesses the unusual characteristic property when heated in bulk with water, milk or other liquid to form a colloidal jel, while another portion at the same time absorbs liquid so forming semi-solid masses. In the baking of cakes good results have been obtained by adding 4 gr. of the above composition to a 1 lb. package of prepared cake mixture which is sold on the market under a variety of different trade names. However, most prepared cake mixes include sugar, cake flour, vegetable shortening, baking powder, egg white, salt and artificial flavoring to form a batter composition, which when mixed with milk or water, provides an adequate cake batter for a white cake. The makers of various cake mixes require in addition to milk or water, one or two egg yolks in the production of yellow cake. In tests, it has been found that by substituting from 4 to 8 gr. of the present composition for the two egg yolks required in the making of yellow cakes from prepared cake mixtures, extremely good results were obtained, and in certain of the tests with varying amounts of the present admixture between the limits of 4 to 8 gr. the grain texture of the cake was improved without materially decreasing the cake volume. As an example, cakes were baked with a prepared cake mixture sold under the trade name of "Swansdown Instant Cake Mix," which includes sugar, cake flour, vegetable shortening, baking powder, egg white, salt and artificial flavoring with varying amounts ranging from 4 to 8 gr. of the egg substitute added in lieu of the required two egg yolks for yellow type cakes.

Example A

A cake was baked using a 1 lb. package of any instant cake mix at present on the market, including the above ingredients of conventional proportions to which was added 4 gr. of the egg substitute and the cakes were mixed and baked in accordance with well-known practice, as well as the directions on the cake mix package which specify the addition of one half cup milk to the cake mix and beating the mixture two minutes with an electric mixer, and then adding two thirds of a cup of milk and beating for one minute, likewise with an electric mixer. In lieu of the two egg yolks required, 4 gr. of the egg substitute composition was mixed therewith with the first one half cup of milk. The batter was then baked in a pre-heated oven at a temperature of 375° F. for a period of between 20 to 25 minutes. It was found that the volume decrease was very slight, but the grain texture was very good and was free of large voids and tunnels.

Example B

A cake was baked in accordance with the procedure set down in Example A, and using the same cake mix, but substituting 8 gr. of the egg substitute composition instead of the 4 gr. set down in Example A. The cake showed a volume of 98 as before, and the grain texture likewise was 98. These figures were the same for the volume and grain texture of the cake in Example A, except that the grain texture in Example A cake had a reading of 99, a difference of one point. The grain texture in Example B was found to be excellent in all respects.

There are numerous prepared cake mixes which are sold both for commercial and domestic purposes. Such prepared cake mixes generally include dehydrated flour by weight 40 parts, sugar by weight 42 parts, shortening by weight 10 parts, powdered skim milk by weight 2 parts, powdered egg white 2 parts, leavening agent by weight 1½ parts, salt by weight 0.70 part, and flavoring such as vanillin 0.20 part. Slight deviations from the above amounts of ingredients provide cake mixes of different types, and the ingredients are mixed generally in the order indicated.

When mixing the egg substitute composition with a prepared mix, including some or all of the ingredients above mentioned which are common to cake mixes of the prepared type, 1 teaspoonful of egg substitute composition is dissolved in one third cup of water or milk and added to the cake mix preparation for each egg required.

While the invention has been described primarily for use in connection with prepared cake mixes, it is obvious that it can be used with equal facility as an egg substitute for various types of batters prepared in accordance with conventional techniques domestically as well as commercially. For instance, the egg substitute composition can be used to replace the egg ingredients in batters for pancakes, griddle cakes, biscuits, corn bread and johnny cake by simply substituting 1 teaspoonful or 4 gr. of the egg substitute composition for each egg called for in the batter recipe.

The use of tapioca flour in applicant's egg substitute produces the moisture content of the prepared cake mix by the absorption of moisture, and in addition entrains gases during mixing in such a manner as to cause even and fine cake texture uniformly throughout the entire cake when the cake mixture is baked to form cakes or other products. It is believed that the absorption of moisture from the prepared cake mixture retained by the flour, which in some cases is as high as 13 per cent, and holding these particles of moisture during mixing of the egg substitute composition and cake flour is the reason the finished baked product possesses such even and uniform texture. It is believed that the reason such good results are obtained is due to the absorption of moisture from the prepared cake flour. The colloidal jel portion of the tapioca flour is believed to entrap gases formed by the acids such that uniform distribution of the tapioca flour throughout the batter will form evenly distributed voids when the cake is subjected to heat treatment as by baking. It is known that the tapioca flour particles divide into colloidal jel portions and moisture absorbing portions when subjected to moisture and heat.

Applicant's egg substitute in analysis includes the following:

| | |
|---|---|
| Moisture | 9.0% |
| Protein | 13.6% |
| Fat | 1.2% |
| Ash | 0.6% |
| Crude fiber | Trace only |
| Carbohydrates (by difference) | 75.6% |
| Dye | Trace |

The unusual properties of tapioca flour which includes the ability to react with moisture and heat to form colloidal jel and moisture absorbing portions in a manner different than other flours results in a finished bakery product of smoother, more uniform and better texture, and enhances the tasting qualities when the egg substitute composition is used to replace eggs in various cooking and baking processes. During baking, the egg substitute and batter mix are heated to a temperature in the neighborhood of 375° F. which causes the entrained moisture in the tapioca flour to be liberated in the form of steam. Carbon dioxide gas is formed in the baking process by the bicarbonate of soda and the formation of a uniform texture.

While in the foregoing description I have described the egg substitute as used in cakes and other baked products, I wish it clearly understood that this is for explanatory purposes only, and that the product is for use in all edible food products in which real eggs are presently used.

What I claim is:

1. An egg substitute in dry powder form consisting of rice and tapioca starches mixed with powdered skim milk and hen albumen, and a gas-forming agent.

2. An egg substitute consisting of processed rice flour, tapioca flour, powdered skim milk, powdered hen egg albumen, cream of tartar, and sodium bicarbonate.

3. An egg substitute for use in baking products and the preparation of batters therefor consisting of processed rice flour, tapioca flour, powdered skim milk, powdered hen egg albumen, cream of tartar, sodium bicarbonate and powdered yellow egg coloring.

4. An egg substitute admixture for prepared cake flour mixtures comprising a short jel starch such as rice and tapioca flour, powdered skim milk, powdered hen egg albumen, cream of tartar and sodium bicarbonate.

5. An egg substitute admixture for prepared cake flour mixtures consisting of 100 lbs. of processed rice flour, 25 lbs. of tapioca flour, 25 lbs. powdered skim milk, 10 lbs. powdered hen egg albumen, 3 lbs. cream of tartar, 1 lb. sodium bicarbonate, and 8 oz. of powdered yellow egg coloring, said admixture being added to the prepared cake mixture in the ratio of 4 gr. to each pound of cake mixture.

6. An egg substitute admixture for prepared cake flour mixtures adapted to be subsequently baked into an edible product, comprising processed rice flour, tapioca flour, powdered skim milk, powdered hen egg albumen, cream of tartar, sodium bicarbonate, and powdered yellow egg coloring, said admixture being added to the prepared ready-mixed cake flour in the approximate proportions 4 to 8 gr. to each pound of ready-mixed cake flour.

7. The method of producing an egg substitute admixture for ready-mixed cake flour adapted to be subsequently baked into an edible product, comprising: first mixing cream of tartar and an artificial coloring by milling; adding hen egg albumen to the cream of tartar and coloring; mixing rice and tapioca flour and powdered skim milk with the cream of tartar and coloring and hen egg albumen, and finally mixing sodium bicarbonate therewith, said egg substitute being mixed with the prepared and ready mixed cake flour in approximately the proportions of 4 to 8 gr. to each pound of flour.

MONTIE M. HEALY.

REFERENCES CITED

The following references are of record in the file of this patent:

UNITED STATES PATENTS

| Number | Name | Date |
|---|---|---|
| 170,670 | Griffin | Dec. 7, 1875 |
| 458,420 | Furber | Aug. 25, 1891 |
| 977,746 | Lasby | Dec. 6, 1910 |
| 1,373,651 | Cullen | Apr. 5, 1921 |
| 1,944,880 | Finkel | Jan. 30, 1934 |

FOREIGN PATENTS

| Number | Country | Date |
|---|---|---|
| 21,733 | Great Britain | A. D. 1908 |